Dec. 8, 1953  F. NIESEMANN  2,661,578
FLUID PRESSURE REGULATOR
Filed March 6, 1947  2 Sheets-Sheet 1

INVENTOR.
Fritz Niesemann
BY Strauch & Hoffman
attorneys

Dec. 8, 1953 F. NIESEMANN 2,661,578
FLUID PRESSURE REGULATOR
Filed March 6, 1947 2 Sheets-Sheet 2

INVENTOR.
Fritz Niesemann
BY Strauch & Hoffman
attorneys

Patented Dec. 8, 1953

2,661,578

UNITED STATES PATENT OFFICE 2,661,578

FLUID PRESSURE REGULATOR

Fritz Niesemann, Pittsburgh, Pa., assignor to Rockwell Manufacturing Company, Pittsburgh, Pa., a corporation of Pennsylvania Application March 6, 1947, Serial No. 732,765

3 Claims. (Cl. 50—23)

This invention relates to improvements in pressure regulators for gas lines.

Such regulators are designed to control the pressure of the gas being delivered to a gas-using appliance such as a burner, stove, water heater, or the like, so that the pressure of the gas being delivered to the appliance will remain constant even though the supply pressure will fluctuate. Regulators of this general type are disclosed in my prior United States Patents Nos. 2,137,025 and 2,380,459.

Regulators of this general type have a flexible diaphragm which is subjected on one side to the pressure of the flowing gas, this pressure being balanced on the other side by atmospheric pressure and adjustable restraining spring. The diaphragm in its movements shifts a valve with respect to its seat to provide a substantially constant pressure to the gas being discharged from the regulator. The diaphragms are generally made of cloth or the like impregnated with a flexible plastic to seal them against the passage of gas therethrough. They may alternately be made of relatively thin flexible metal or the like. In view of the fact that the diaphragms during their life are subjected to the corrosive and drying and other effects of the gas passing thru the regulator, and are subjected to a relatively infinite number of flexures caused by reversals of forces, the diaphragm sometimes weakens or breaks, thus requiring replacement to prevent the leakage of the gas to the atmosphere.

I have provided a novel regulator wherein the diaphragm may be removed and replaced with a minimum of disassembly of the valve structure. Also, by means of my improved novel construction, it is possible to replace the diaphragm without disconnecting any of the conduits leading to or from the regulator. Other improvements include a novel means for connecting the regulator valve to the diaphragm in such a flexible manner that the valve may seek the proper position upon its seat and the diaphragm may seek its proper center without applying any forces to the valve stem which would cause it to bind within its guide.

It is therefore a primary object of my invention to provide a novel and improved regulating valve structure which may be disassembled with a minimum amount of work to inspect and/or replace worn out or broken elements thereof.

It is another object of my invention to provide an improved regulator structure wherein the diaphragm is permitted to seek its own center and the valve connected thereto is permitted to find its own seat.

Another object of my invention is to provide an improved system whereby the gas exhausting from the regulator has an aspirating effect to reduce the pressure of the gas on the high pressure side of the diaphragm.

Other objects will become apparent as the description progresses in connection with the accompanying drawings, wherein.

Figure 1:
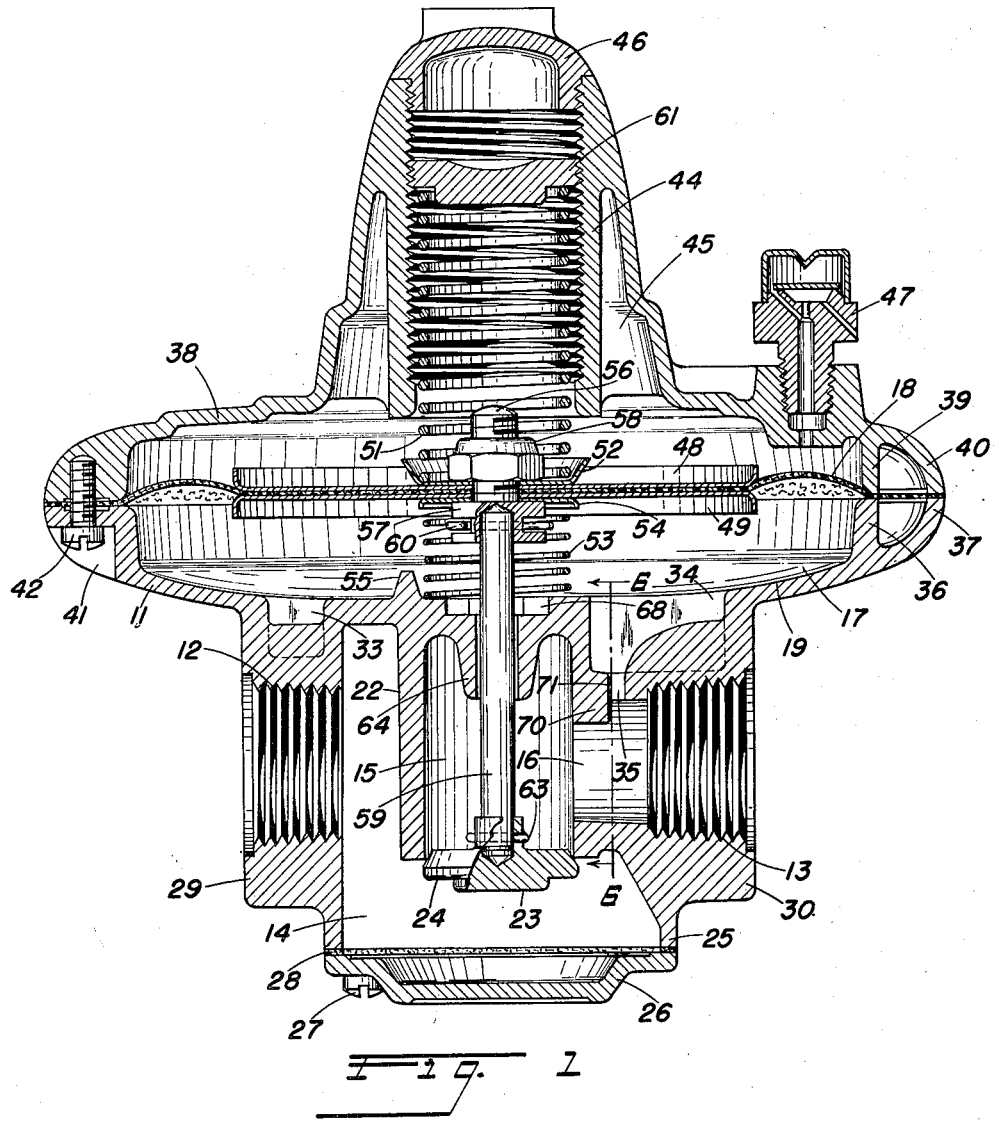
Figure 1 is a vertical sectional view thru a regulator embodying the aforesaid improvements.

Referring to the drawings, the regulator comprises a body 11 having integral therewith flow passages including a threaded inlet 12 and a threaded outlet 13, an inlet chamber 14, an expansion chamber 15, and an outlet passage 16 extending laterally from the expansion chamber 15 and coaxial with the threaded outlet 13. The entire body 11 is a pressure casting of aluminum alloy, and is therefore of one-piece construction. The upper part of the body is formed with a depression to form a diaphragm chamber 17 between a flexible diaphragm 18 and the cup-shaped surface 19 of the diaphragm chamber 17.

The expansion chamber 15 is formed by a downwardly extending hollow boss 22, which is open at its lower end to form a valve seat for a valve 23 having a conical surface 24 for engaging the seat. A second downwardly extended tube 25 of substantially rectangular cross-section, as is apparent from Figures 4 and 5, surrounds the hollow boss 22 and extends downwardly past the bottom end thereof. The lower end of the tube 25 is closed by a cover plate 26 fastened by screws 27 against a gasket 28. The walls of the tube 25 are thickened on the inlet and outlet sides of the valve as indicated by the reference numerals 29 and 30 to provide sufficient strength and material for the threaded inlet 12 and outlet 13.

Figure 3:
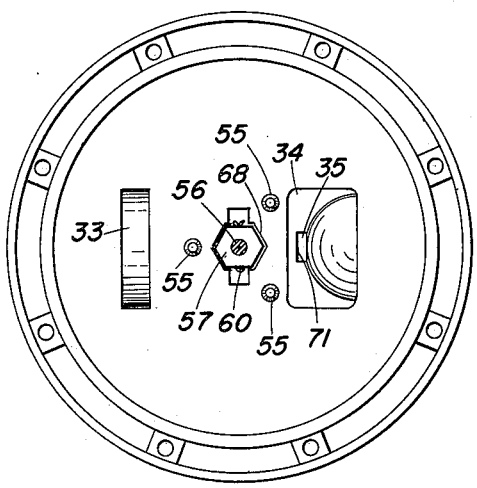
Figure 3 is a top plan view of the regulator body with the cover and diaphragm removed.
Figure 4:
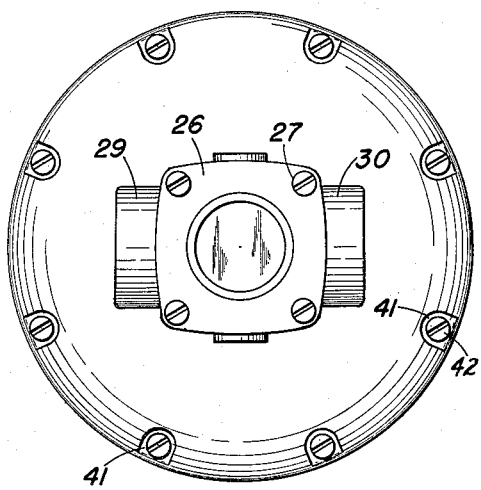
Figure 4 is a bottom view of the regulator shown in Figure 1.
Figure 6:
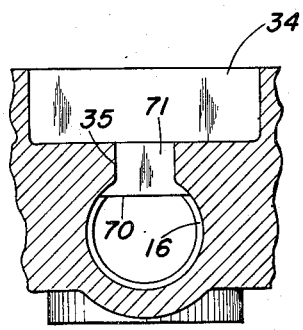
Figure 6 is a sectional view substantially along the line 6—6 of Figure 1.

As shown in Figure 1, the thickened portion 30 extends to and is integral with the hollow cylindrical boss 22 to provide the wall of the outlet passage 16 that is coaxial with the threaded outlet 13. In order to lighten the body 11, the surface 19 of the diaphragm chamber 17 has a depression 33 (Figures 1 and 3) overlying the threaded inlet 12. Another depression 34 is formed over the threaded outlet 13 and the outlet passage 16, as shown in Figures 1, 4 and 6. At the bottom of the depression 34 is provided a vertical passageway 35 for aspirating gas from the diaphragm chamber 17 to the outlet passage 16, as will be explained.

The peripheral portion of the body 11 is bifurcated to provide two concentric upwardly extending walls 36 and 37, terminating in a common plane.

The regulator also includes an aluminum alloy pressure casting forming a cover 38. The cover 38 at its periphery has a pair of spaced concentric walls 39 and 40 terminating in a common plane and meeting the upper ends of the walls 36 and 37 of the body 11 so as to form a pair of spaced concentric clamping surfaces to clamp the diaphragm 18 around its periphery between the body 11 and the cover 38. At equiangularly spaced intervals the aforesaid wall 37 on the body 11 is depressed as shown at the left of Figure 1 and in Figure 4 to form recesses 41 to receive the heads of clamping screws 42 to clamp the body 11 to the cover 38. At these points, the space between the walls 39 and 40 of the cover 38 are filled to provide material which is tapped to receive the screws 42. Thus the diaphragm 18 is clamped at two concentric sections adjacent its periphery so that a positive seal is secured and so that there is relatively less strain imposed on the diaphragm by flexing it in reverse directions due to changing gas pressures. A smaller strain is placed upon the diaphragm because of the fact that it is clamped at two concentric annular portions rather than in just one annular portion.

The central portion of the cover 38 extends upwardly and surrounds an internally threaded tube 44, connected thereto by webs 45. The tube 44 is coaxial with the hollow boss 22 and the expansion chamber 15 formed thereby in the body 11. The upper end of the tube 44 is closed and sealed by a removable plug 46 threaded thereinto.

The space within the cover 38 and above the diaphragm 18 is vented to the atmosphere by a fitting 47 so that the gas pressure above the diaphragm will remain substantially the same as atmospheric pressure by allowing the atmosphere to enter this space or be ejected therefrom as the diaphragm moves downwardly or upwardly. The vent also permits the exhausting of any gas which might pass through the diaphragm 18 because of a leak therethrough. The operation of the fitting 47 is clearly shown in the drawing in Figure 1. Further detailed description of the construction and operation of the fitting 47 may be found in the United States Patent No. 2,302,284.

The central portion of the diaphragm 18 is clamped between upper and lower diaphragm pans 48 and 49, which have opposing planar portions terminating in rounded peripheral walls as shown in Figure 1, so that the diaphragm 18, where it extends beyond the pans 48 and 49, will engage only the rounded outer surfaces of these peripheral walls as the diaphragm and the pans move upwardly or downwardly under the influence of changing gas pressures. A coiled compression spring 51 is disposed vertically within the tube 44 in the cover 38. The lower end of the spring is retained in a position centrally of the diaphragm 18 by a pan 52 having a peripheral upturned flange. A second coiled compression spring 53 is disposed between the lower diaphragm pan 49 and the surface 19 at the center thereof. The spring 53 is retained centrally of the diaphragm 18 by a pan 54 having a peripheral wall adapted to centralize the spring. At its lower end, the spring 53 is retained in its central position by three equiangularly spaced projections 55 arranged around the center of the surface 19, as shown in Figures 1 and 3. These projections 55 also have another function which will be explained later.

The diaphragm 18, the upper and lower pans 48 and 49, and also the spring retaining pans 52 and 54, are all held together and clamped in their coaxial relationship by a threaded stud 56 having a non-circular head 57 on the bottom thereof, the aforesaid elements being clamped together and against said head 57 by a nut 58, preferably of the self-locking type.

The downward force exerted on the diaphragm by the compression spring 51 is adjusted by turning a ferrule 61 threaded into the tube 44, and is accessible for adjustment by removing the plug 46. The non-circular head 57 and the valve 23 are each provided with blind bores into which are inserted the upper and lower ends respectively of a valve stem 59. Thus the upper and lower ends of the valve stem have relatively loose fits within the head 57 and the valve 23. The stem 59 is retained in the head 57 by a cotter pin 60 passing transversely through both the head 57 and the valve stem. In the illustrated embodiment, the non-circular head 57 is hexangonal as shown in Figure 3, and is provided with an annular groove around its periphery whereby the cotter pin can be of shorter length and its head and separated prongs lie partially within the groove in the head 57. A pin 63 passes transversely through the valve 23 and the lower end of the valve stem 59 to secure the stem to the valve. Thus the stem 59 is loosely but positively secured to the diaphragm 18 and also loosely but positively secured to the valve 23. The loose attachment of the diaphragm and valve to the stem 59 permits the diaphragm to seek its own center and also permits the valve 23 to seek its own center without bending or twisting the valve stem 59 in such manner as to cause it to bind in its guide.

The stem 59 is positioned and guided for vertical movement by a valve guide 64 formed centrally of and integral with the hollow cylindrical boss 22. A definite clearance is provided between the stem 59 and the guide 64 to permit the passage of gas from the expansion chamber 15 to the diaphragm chamber 17, as will be explained.

As previously mentioned, one of the important objects of the invention is to provide means facilitating the inspection and removal of the diaphragm 18 with a minimum of effort and with a minimum of disassembly of the complete regulator. Regulators of this type, as previously constructed, once assembled into a conduit system, are frequently so placed that it is difficult to reach them and disassemble them for the purpose of inspection or repair. In some installations, it may even be necessary to disconnect the regulator from the conduit in which it is installed before it can be disassembled for inspection or repair. The diaphragm 18 is a part that occasionally requires inspection and replacement. By means of my novel and improved construction however, I have provided a regulator where the diaphragm can be removed and replaced merely by removing the cover 38. It will be apparent from Figure 1 that when the cover 38 is removed, the diaphragm 18 and the pans 48 and 49, etc., are still attached to the valve stem 59 by the cotter pin 60, which cannot be reached for removal when the cover 38 is removed, because of the large diameter of the diaphragm pans 48 and 49. In order to remove the diaphragm 18, it is therefore necessary to remove the nut 58 from the stud 56 so that the pans 52 and 48, together with the diaphragm 18, may be lifted from the stud. In order to remove the nut 58, however, it is necessary to hold the stud 56 against rotation.

In the past, it has been customary to remove the cover plate 26 from the bottom of the regulator so that a tool such as a screwdriver can be inserted to engage a slot in the bottom of the valve 23 and hold the valve, stem 59, and the stud head 57 against rotation while the nut 58 was removed. Thus it has been necessary to remove at least one additional cover plate and use a second tool for holding the valve in order to remove the nut and the diaphragm 18. Also, when the regulator in its installed position in the conduit, lies closely adjacent a horizontal partition or floor, it is very inconvenient to remove the cover plate 26 and hold the valve 23 against rotation without providing special tools for engaging the screws 27 and the valve 23.

Figure 5:
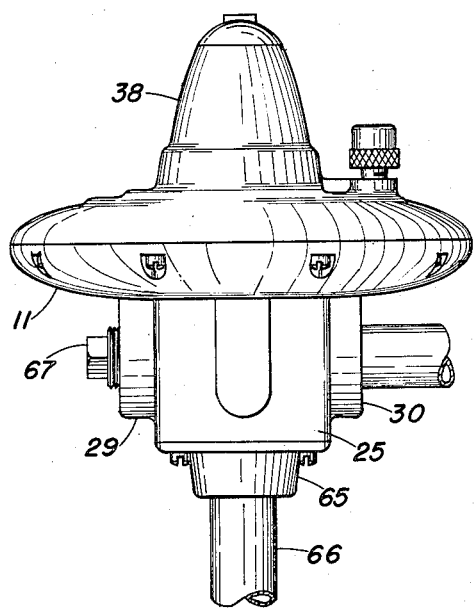
Figure 5 is a side elevation of a regulator embodying my improvements and having the fluid inlet conduit entering the regulator axially thru the bottom thereof.

Figure 5 illustrates an installation where the conduit itself must be disconnected and removed from the regulator before access can be obtained to the valve 23 to hold it while removing the nut 58. In the installation of Figure 5, the cover plate 26 of Figure 1 is replaced by a fitting 65 that has an internally threaded boss to receive the upper threaded end of an inlet conduit 66. A threaded plug 67 closes the inlet 12 of Figure 1 when the installation at Figure 5 is used. Thus the cover plate 26 of Figure 1 or the fitting 65 and pipe 66 of Figure 5, must be removed in either event merely to hold the valve 23 against rotation in order to remove the diaphragm.

However, when the regulator is constructed in accordance with my invention, the cover plate 26 of Figure 1 and the removable fitting 65 of Figure 5, are required only for the purpose of placing the valve 23 and the stem 59 within the regulator body 11 during initial assembly at the factory. Once the valve and stem have been inserted and the cover plate 26 or the fitting 65 is attached, they need not be removed again at any time for the mere purpose of removing the diaphragm 18 for inspection or replacement.

Figure 2:
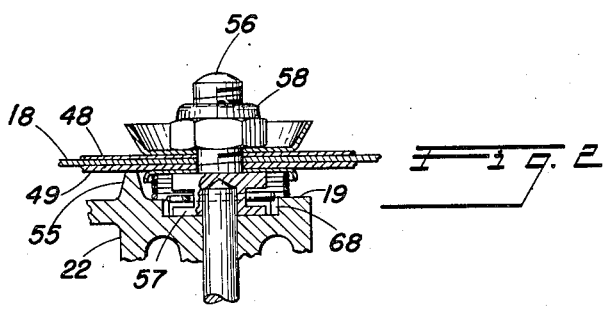
Figure 2 is a sectional view of a portion of the regulator shown in Figure 1, but with the diaphragm depressed to its lowermost position so that the stud which clamps it is held against rotation while a clamping nut is removed, whereby the diaphragm can be removed from the regulator.

As shown in Figures 1, 2 and 3, the upper surface 19 of the diaphragm chamber 17 has a hexagonal depression 68 of such size that it will receive the bottom portion of the hexagonal head 57 and hold it against rotation when the diaphragm 18 and the pans 48 and 49, etc., are pushed downwardly to the position shown in Figure 2. As also shown in Figure 2, the projections 55 are of such height that they engage the bottom surface of the diaphragm pan 49 to position the diaphragm assembly in a horizontal position spaced from the surface 19 when the hexagonal head 57 is seated in the depression 68. As is shown in Figure 3, the depression 68 is enlarged on a pair of diametrically opposed sides thereof and in alignment with the cotter pin 60 so that the end portions of the cotter pin projecting beyond the periphery of the hexagonal head 57 do not prevent the head from seating in the depression 68.

When initially assembling the regulator at the factory the valve stem 59 and the attached valve 23 are inserted into the regulator body through the open bottom of the tube 25. With the cover 38 or the fitting 65 not yet attached, the upper end of the valve stem 59 is inserted into the bore provided therefor in the head 57, and the cotter pin 60 is inserted through the head and stem 59 to hold them in assembled relationship. The spring 53 is then placed around the valve stem, and the pan 54, the pan 49, the diaphragm 18, pan 48, and pan 52 are placed over the threaded stud 56 and forced down over it until the pan 54 is abutting the top of the hexagonal head 57. The entire assembly is then pressed downwardly so that the spring 53 is compressed and the hexagonal head 57 is seated in the depression 68 as shown in Figure 2. While so seated, the nut 58 is threaded onto the stud until it securely clamps all of the aforesaid elements against the head 57. The head 57 is held against turning by the side walls of the depression 68 while a wrench or other tool is used to tighten the nut 58. The cover 38 is placed over the regulator body 11 and the screws 42 are inserted and tightened to clamp the periphery of the diaphragm between the cover and the body. The spring 51 may then be dropped into the tube 44 so that it seats upon the pan 52 and the ferrule 61 inserted to adjust the compression of the spring, whereupon the top of the cover is closed by the plugs 46.

The cover 26 or the fitting 65 may be secured to the bottom end of the regulator body 11 at any time after the valve 23 and stem 59 have been inserted, because after that time there is no need to gain access to that part of the regulator body.

Once the regulator has been installed in a conduit, and it is desired to inspect and remove the diaphragm 18, it is only necessary to remove the clamping screws 42 so that the cover 38 can be lifted and removed, together with the spring 51. The diaphragm assembly is then pressed downwardly to the position shown in Figure 2 so that the head 57 is held against rotation while the nut 58 is loosened and removed. The entire diaphragm assembly, including the pan 49 and the pan 54, may then be lifted up from the stud 56 for examination and replacement of any part thereof. Reassembly of these elements is the same as during initial assembly, and the regulator is then completely reassembled by resting the spring 51 centrally upon the pan 52, replacing the cover 38, and fastening it to the bottom 11 by the screws 42.

The lower spring 53 between the diaphragm and the surface 19 of the diaphragm chamber 17 serves to increase the differential pressure required to open the valve 23 further with increasing differential pressure between the gas in the diaphragm chamber 17 and the chamber within the cover 38, as will be understood.

My improved regulator also incorporates the teachings of my United States Patent No.

2,137,025 issued November 15, 1938, and adds certain improvements thereto. As taught in the aforesaid patent, the bore within the valve guide 64 for the stem 59 has a substantial clearance so that gas within the expansion chamber 15 may pass upwardly through the bore into the diaphragm chamber 17, and the outlet passage 16 communicates with the diaphragm chamber 17 through a vertical passageway 35 so that the gas flowing through the passageway 16 has an aspirating effect to reduce the pressure in chamber 17. In accordance with the teachings of my United States Patent 2,137,025 the cross-sectional area of the passageway should be from three to seven times the cross-sectional area of the clearance between the valve stem 59 and its guide. The purpose of this construction is to maintain a substantially constant outlet pressure substantially independent of variations in inlet pressure and rate of flow thru the regulator. I have found that this aspirating effect can be so controlled as to attain an optimum performance resulting in a more uniform outlet pressure control when constructed as shown in Figures 1 and 6.

The outlet passage 16 connecting the expansion chamber 15 to the threaded outlet 13 increases slightly in diameter in the direction of flow. At the entrance to the passage 16, however, I provide a sharp cornered, downwardly extending projection 70, the bottom edge of which is horizontal and forms a chord with respect to the circular wall of the passage 16. The inner surface of the projection 70 forms a continuation of the inner cylindrical surface of the boss 22. The outer edge, facing the threaded outlet 13, lies in the same vertical plane as the inner vertical wall 71 (Figs. 1, 3 and 6) of the passageway 35.

The improved regulator, one embodiment of which is shown in the drawings, is therefore more easily assembled at the factory and more easily disassembled and reassembled for the inspection and replacement of parts after being installed in the conduit system wherein it is used, by reason of the fact that the diaphragm assembly may be disconnected from the valve stem and removed from the regulator without having to obtain access to the valve 23 with a special tool or the like in order to hold the stem 59 against rotation. The loose connections whereby the diaphragm and the valve are attached to the valve stem permits each of them to seek its own respective center without twisting the valve stem so as to cause it to bind within its guide. The new disposition of the projection 70 within the outlet passage 16 and with respect to the vertical passageway 35 imparts new characteristics improving the maintenance of a constant outlet pressure with varying inlet pressures and rates of flow. While the illustrated embodiment shows a hexagonal stud head 57 and a hexagonal recess 68 in the surface 19, it is to be understood that such shape is by way of example only, and that they may be of any other suitable shape such that the recess 68 engages the head 57 to hold it against rotation while the nut 56 is tightened or loosened.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid pressure regulator comprising a body having a fluid passage formed therethrough between an inlet and an outlet, a diaphragm chamber wall mounted on the exterior thereof, an aperture therethrough extending from said passage through said wall, and a valve seat interposed in said passage between said inlet and said outlet coaxial with said aperture; a diaphragm peripherally clamped over said diaphragm chamber wall to form a diaphragm chamber; a pair of diaphragm clamping elements centrally disposed on opposite sides of said diaphragm, interconnected therethrough, and so constructed that relative rotary manipulation thereof will effect their connective engagement or disengagement, the one of said clamping elements on the side of said diaphragm adjacent said wall being practicably inaccessible so long as the diaphragm is in its operative position on said one clamping element; a valve stem pivotally suspended from said one clamping element and extending freely through said aperture toward said valve seat; and a valve member pivotally suspended from the free end of said valve stem below said valve seat for co-operation therewith to control the flow of fluid through said passage, the connection between said valve and valve stem being practicably inaccessible so long as said valve stem is connected to said one clamping element; means for facilitating the manipulation of said clamping elements to permit removal and attachment of said diaphragm without damage comprising means defining a non-circular recess in said wall around said aperture and a similarly non-circular portion formed on the adjacent end of said one clamping element so that, by movement of said one element to engage said recess, said one element will be held against rotary and axial movement to permit manipulation of the other of said elements to effect connective engagement or disengagement thereof for mounting and demounting said diaphragm.

2. In a fluid pressure regulator comprising a body having a fluid passage formed therethrough between an inlet and an outlet, a diaphragm chamber wall formed on the exterior thereof, an aperture therethrough extending from said passage through said wall, and a valve seat interposed in said passage between said inlet and said outlet coaxial with said aperture; a diaphragm peripherally clamped over said diaphragm chamber wall to form a diaphragm chamber; a pair of diaphragm clamping elements centrally disposed on opposite sides of said diaphragm, interconnected therethrough, and so constructed that relative rotary manipulation thereof will effect their connective engagement or disengagement, the one of said clamping elements on the side of said diaphragm adjacent said wall being practicably inaccessible so long as the diaphragm is in its operative position on said clamping element; a valve stem suspended from said one clamping element and extending freely through said aperture toward said valve seat; and a valve member suspended from the free end of said valve stem below said valve seat for cooperation therewith to control the flow of fluid through said passage, the connection between said valve and valve stem being practicably inaccessible so long as said valve stem is connected to said one clamping element; means for facilitating the manipulation of said clamping elements to permit removal and attachment of said diaphragm without damage comprising means defining a non-circular recess in said wall around said apertures; and a similarly non-circular portion formed on the adjacent end of said one clamping element so that, by movement of said one element to engage said recess, said one element will be held against rotary and axial movement to permit manipulation of the other of said elements to effect connective engagement or disengagement thereof for mounting or demounting said diaphragm.

3. The combination defined in claim 2 wherein the non-circular recess formed in said wall around said aperture and the non-circular portion formed on the adjacent end of said one clamping element are of like polygonal cross section.

FRITZ NIESEMANN.

References Cited in the file of this patent

UNITED STATES PATENTS

| Number | Name | Date |
|---|---|---|
| 1,410,070 | Mueller | Mar. 21, 1922 |
| 1,476,253 | Hewitt | Dec. 4, 1923 |
| 1,637,764 | Coles | Aug. 2, 1927 |
| 1,800,995 | Gaunt | Apr. 14, 1931 |
| 1,897,061 | Lapp | Feb. 14, 1933 |
| 1,984,592 | MacLean | Dec. 18, 1934 |
| 2,038,153 | Williams | Apr. 21, 1936 |
| 2,137,025 | Niesemann | Nov. 15, 1938 |
| 2,288,733 | Niesemann | July 7, 1942 |
| 2,380,459 | Niesemann | July 31, 1945 |
| 2,487,089 | Anthes | Nov. 8, 1949 |

FOREIGN PATENTS

| Number | Country | Date |
|---|---|---|
| 237,999 | Great Britain | of 1925 |